(12) United States Patent
Coleman et al.

(10) Patent No.: US 9,131,355 B2
(45) Date of Patent: Sep. 8, 2015

(54) SYSTEM AND METHOD OF CONFIGURING OPERATIONS OF COMMUNICATION SERVICES

(75) Inventors: Gregory Coleman, San Francisco, CA (US); Daniel Dreilinger, San Francisco, CA (US)

(73) Assignee: CBS Interactive Inc., San Francisco, CA (US)

( * ) Notice: Subject to any disclaimer, the term of this patent is extended or adjusted under 35 U.S.C. 154(b) by 38 days.

(21) Appl. No.: 13/250,049

(22) Filed: Sep. 30, 2011

(65) Prior Publication Data

US 2013/0086179 A1   Apr. 4, 2013

(51) Int. Cl.
*G06F 15/16*      (2006.01)
*H04W 4/12*      (2009.01)
*G06Q 10/10*    (2012.01)
*H04W 4/20*      (2009.01)

(52) U.S. Cl.
CPC ................. *H04W 4/12* (2013.01); *G06Q 10/10* (2013.01); *H04W 4/206* (2013.01)

(58) Field of Classification Search
CPC .................................................. G06Q 30/0251
USPC ......................................................... 709/206
See application file for complete search history.

(56) References Cited

U.S. PATENT DOCUMENTS

| | | | |
|---|---|---|---|
| 2008/0069098 A1* | 3/2008 | Shah et al. | 370/390 |
| 2010/0169264 A1* | 7/2010 | O'Sullivan et al. | 706/52 |
| 2010/0169802 A1* | 7/2010 | Goldstein et al. | 715/760 |
| 2010/0250682 A1* | 9/2010 | Goldberg et al. | 709/206 |
| 2011/0191282 A1* | 8/2011 | Chan et al. | 706/52 |
| 2011/0270880 A1* | 11/2011 | Jesse et al. | 707/770 |
| 2012/0209839 A1* | 8/2012 | Andrews et al. | 707/728 |
| 2012/0209907 A1* | 8/2012 | Andrews et al. | 709/204 |
| 2012/0259927 A1* | 10/2012 | Lockhart | 709/206 |
| 2012/0278117 A1* | 11/2012 | Nguyen et al. | 705/7.15 |
| 2013/0006758 A1* | 1/2013 | Hegeman et al. | 705/14.46 |
| 2013/0007146 A1* | 1/2013 | Maynard et al. | 709/206 |
| 2013/0013702 A1* | 1/2013 | Ebisawa et al. | 709/206 |
| 2013/0036427 A1* | 2/2013 | Chen et al. | 719/312 |
| 2013/0080526 A1* | 3/2013 | Gill et al. | 709/204 |
| 2013/0080767 A1* | 3/2013 | Francis et al. | 713/154 |
| 2013/0124310 A1* | 5/2013 | Barbieri et al. | 705/14.49 |
| 2013/0304731 A1* | 11/2013 | Zheng et al. | 707/728 |

* cited by examiner

*Primary Examiner* — Hamza Algibhah
(74) *Attorney, Agent, or Firm* — Mahamedi Paradice LLP (57) ABSTRACT

Information is recorded that corresponds to an online activity of a user. The information identifies at least one or more instances of time when the online activity occurred. A communication from the communication service is delivered to the user at a selected transmission time that is based at least in part on the one or more instances of time. The communication service may be configured or otherwise instructed to send (or not send) the communication at a particular time.

18 Claims, 4 Drawing Sheets

SYSTEM AND METHOD OF CONFIGURING OPERATIONS OF COMMUNICATION SERVICES

TECHNICAL FIELD

Embodiments described herein pertain to a system and method for configuring operations of communication services.

BACKGROUND

Messaging and other communication services exist in various forms. For example, many email subscriptions exist that provide subscribers with messaging content that includes promotional offers, products or "deals". As other examples, some messaging services transmit topical information or newsletters on specific topics. Messaging services can also be incorporated user-forums and/or social networks, as a mechanism to enable communications amongst a network or group of persons who share an interest.

Messaging services, for example, typically communicate messages to subscribers/users at a set time, so that the recipients of the messages receive the messages at set times that are not user-specific, but based on communication-side considerations (e.g. load balancing, server resources, etc.). As an example, "daily deal" services often transmit daily-deal emails to subscribers at a specific time of day (e.g. midnight), without any consideration as to a preference or tendency of the recipient of the email.

Still further, some other services generate messages based on events. For example, some social network forums operate by sending communications to a network of users in response to an event, such as a user posting a message to a corresponding forum.

DETAILED DESCRIPTION

Embodiments described herein pertain to a system and method for configuring operations of communication services. In particular, some embodiments provide for configuring or instructing communications services in transmitting communications to recipients in order to accommodate known or predicted receptiveness of individual recipients to receiving communications at a particular time. According to embodiments, communications (e.g. emails, instant messages, Short Message Service (SMS)) are transmitted at different times for different users in a recipient group of users, in order to accommodate user-specific tendencies or behaviors of at least some users in the group, and to further increase the probability that users in the group will be receptive and respond favorably to the communication. Accordingly, messaging content, for example, can be transmitted at different times to users of a subscriber base in order increase the likelihood that the individual recipient will be receptive and/or provide a favorable response. The timing of when the messages or other communications is transmitted to individual users may be based on determined tendencies of that recipient.

Embodiments include a computer-implemented method or system for operating a communication service. In an embodiment, information is recorded that corresponds to an online activity of a user. The information identifies at least one or more instances of time when the online activity occurred. A communication from the communication service is delivered to the user at a selected transmission time that is based at least in part on the one or more instances of time. The communication service may be configured or otherwise instructed to send (or not to send) the communication at a particular time.

According to another embodiment, information is recorded that correspond to when an online activity occurred for each user in a group of users of a messaging service. A user-specific transmission time is determined for sending a message to each user in the group. The determination of the user-specific transmission time is based at least in part on the determined time when that user is predicted (or has previously been observed) to perform a particular activity (e.g. be online, operate mobile device, perform messaging operations for Internet email account, login to a website). One or more messages are queued that comprise a transmission of a given messaging content for the group of users, based on the transmission time determined for that user. Messages that include the given messaging content are sent to each user in the group at determined transmission times for the corresponding user. As such, the messages from the messaging service are sent at different transmission times for the different users in the group, based on user-specific considerations that include tendencies or behaviors of the user as to when the particular activity is performed or not performed.

Still further, an embodiment includes a system implemented by one or more processors and a memory. The processors and memory operate to provide an event log, a profile determination component, and a profile service. The event log stores entries that identify, among other information, a time in which an activity of a user occurred. The profile determination component analyzes data of the event log to determine information that includes a user-specific transmission time for individual users of the messaging service. The profile service operates to cause the messaging service to selectively queue individual messages that comprise a transmission of a given messaging content, based on the determined user-specific transmission times.

Embodiments described herein recognize that communication services can receive more favorable responses from the user-base of the service if considerations are made for individual users of the recipient group. In particular, embodiments provide for considerations as to when, for example, a user is most likely to be receptive to a communication from a service. The receptiveness of the user to the communication may be predicated on a desired response, such as the user selecting an embedded link in a delivered communication and/or performing a desired activity (e.g. viewing content, or making a purchase online).

As a specific example, a newsletter publisher may increase viewership for an ancillary underlying publication by way of embedding a link in a newsletter email to its recipient base. In such a scenario, the publisher's desired outcome may correspond to (i) the subscribers opening the email, (ii) the subscribers viewing the contents of the email, and/or (iii) the subscribers selecting links embedded in the emails. These activities can all enhance the viewership of the ancillary publication if the ancillary publication is promoted in the email (e.g. email includes extracted content from the publication or link to receive the publication). Embodiments recognize that the desired responses of the individual users (e.g. opening or viewing emails, selecting links) can be increased if the communication is sent to users of the recipient group with user-specific considerations, including considerations for transmission times that predict a certain level of receptiveness by the user for receiving the email. For example, considerations that can be made for individual users is to send messages at a time when the user is predicted (i) to be online, (ii) to have his/her heaviest amount of online activity, and/or (iii) to be engaged in a particular type of activity. Still further, the considerations may exclude sending messages to the user at times that are predictive of the user being offline, or not performing a specific type of online activity (i.e. non-receptive times).

The user-specific considerations may be made based on observed or known tendencies of individual users in partaking in various forms of activity. Specific activities that can be observed include, for example, the user being online in general, the user performing general browsing operations, the user performing browsing operations of a particular type (e.g. e-commerce), the user logging into a website or domain (e.g. fantasy sports site, social network page), the user participating in Instant Messaging or forums, the user operating a mobile device to browse the Internet or send messages, and various other forms of activities.

One or more embodiments described herein provide that methods, techniques and actions performed by a computing device are performed programmatically, or as a computer-implemented method. Programmatically, as used herein, means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be stored on a computer-readable medium. Machines shown or described with figures below provide examples of processing resources and computer-readable mediums on which instructions for implementing embodiments of the invention can be stored and/or executed. In particular, the numerous machines shown with embodiments described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and tablets), and magnetic memory. Computers, terminals, network enabled devices (e.g., mobile devices such as cell phones) and tablets are all examples of machines and devices that utilize processors, memory, and instructions stored on computer-readable mediums. Additionally, embodiments may be implemented in the form of computer-programs, or a computer usable medium capable of storing instructions for such a program.

System Description

Figure 1:
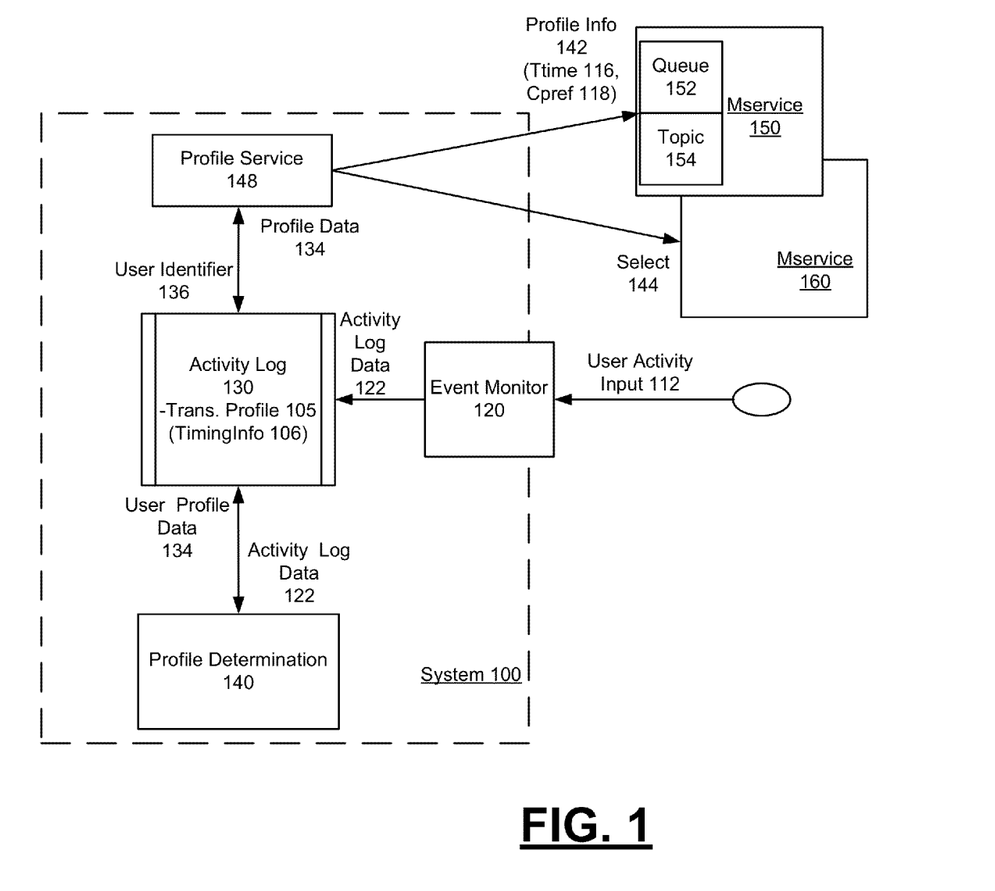
FIG. 1 illustrates a system for operating a messaging service, according to one or more embodiments.

FIG. 1 illustrates a system for operating a messaging service, according to one or more embodiments. A system such as described with an embodiment of FIG. 1 can be implemented as, for example, a network service that operates with communication services that transmit messages (e.g. emails, SMS, Instant messages, etc.) to a user base. Accordingly, components as described with an embodiment of FIG. 1 may be implemented using, for example, one or more servers, or alternatively through computers that operate over a network such to form, for example, a peer-to-peer network.

In an embodiment, system 100 includes an event monitor 120, an activity log 130, a profile determination component 140, and a profile service 148. The components operate to develop, for individual users, a transmission profile 105 that can be applied to configure the manner in which communication services (e.g. messaging services 150, 160) are operated to send communications to those users. Among other information, the transmission profile 105 includes data that specifies timing information 106 (e.g. time of day, time slot, day of week) as to determined times for when messages or other content should be communicated to the individual users ("transmission time").

In an embodiment, system 100 is implemented to determine a transmission profile 105 for individual users of one or more communication services. The transmission profile 105 includes profile information that is indicative of (i) times that the user is likely performing a particular activity, such as being online, or being online and performing a particular type of activity; and/or (ii) content (e.g. category or type of content) that the user is interested in, particularly as to messaging content. The transmission profile 105 may associate the profile information with a user. For example, the transmission profile 105 may be associated with an identifier of a user in a newsgroup or messaging group. Other information, such as demographic information, may optionally be maintained as part of the profile information.

In one embodiment, the transmission profile 105 is developed as a predictive mechanism for anticipating when the user is most likely to be receptive to receiving and/or responding to messaging content. Accordingly, the transmission profile 105 may specify a transmission time 106 (or set of transmission times) for sending messaging content to the user. The transmission time 106 (or times) may specify, for example, a time slot in a day, a day of the week or other timing information as to when the user is likely performing a particular activity, such as being online, or being online and performing a particular online activity (e.g. logged into a website). Numerous other activities are recited with various examples provided herein. In variations, the transmission time 106 may reflect various kinds of timing information, including times when the user is performing a particular kind of activity or not performing the activity. As examples, the transmission time 106 may include recording instances (or range in times) when the user activity is maximum, or exceeds some threshold. Still further, multiple transmissions times 106 may be specified in the transmission profile.

As an alternative or addition, the transmission time 106 may include logic, such as BOOLEAN operations, to specify conditions (including non-timing conditions) that are required to be satisfied in order to send (or not send) messaging content to the user. In the latter case, the BOOLEAN operations may specify, for example, a requirement to send messaging content to users at a time when multiple conditions are satisfied, including times when the monitored user activity exceeds a threshold or is deemed optimal. Thus, BOOLEAN or logical operations may result, in user-specific transmission times for a particular messaging content that is, for example, every other week day, provided that the user accessed an online user account or undertook some online activity on the Monday of the week.

As another alternative or addition, the transmission profile 105 may specify timing for a particular communication service or communication type (e.g. based on content type or mode of delivery), so that multiple transmission times are maintained within a particular profile. Still further, the transmission profile may specify analytics based on observed user online activity. For example, the transmission profile may identify a statistical window of time in a given day that precedes a time when the user is likely to check his email for the first time in the day.

In one implementation, system 100 communicates with messaging services 150, 160 in order to provide the messaging services with profile information 142 that is based on the respective user's transmission profile 105. As an alternative, the system 100 may operate or otherwise include the messaging services 150, 160 that utilize profile information 142. The profile information 142 used by the messaging services 150, 160 can specify (i) the transmission time 116 for when the messaging service 150 should transmit messaging content to the individual user, and/or (ii) content preferences 118 (e.g. categories or topics of preference) that specify a determined preference as to content type or category for the individual users.

As an addition or alternative, the profile information 142 may be utilized by the messaging service 150, 160 as a real-time trigger that reflects current user-behavior. For example, the profile information 142 may reflect that the user is presently online. The messaging service 150, 160 can be configured to respond to the profile information 142 reflecting the user's current online behavior by, for example, transmitting the user a message (e.g., message that captures a present context).

FIG. 1 illustrates an example in which the messaging services 150. 160 service as communication services which can be configured or otherwise instructed to individualize the transmission of messages to its recipients. Examples of messaging services include, for example, opt-in type commercial emails (e.g. promotional emails, daily deals) or newsletters, which can be communicated via protocols such as POP ("Post Office Protocol" (currently version 3)), IMAP ("Internet Message Access Protocol") or SMTP ("Simple Mail Transfer Protocol"). As an alternative or variations, communication services may send communications to recipients using transports and formats other than email. For example, system 100 may configure or instruct communication services that send Short Message Service (SMS) or Multimedia Service (MMS) messages, instant messages, and/or social networking messages to a recipient group.

The event monitor 120 includes programmatic components that receive or otherwise process data that indicates information about the user online activity 112. The online activity 112 may correspond to, for example, the user logging into an account maintained with or in connection with system 100. For example, the system 100 may be incorporated into a website domain in which individual users maintain accounts for purpose of receiving content or performing certain activities. In such implementations, the event monitor 120 can detect when the user accesses the website domain to view, for example, content or perform other online activities. As an alternative or addition, the event monitor 120 may include components for retrieving or accessing information from a tracking cookie stored on a user's terminal. As an alternative, the event monitor 120 may access information from a session cookie provided on the user's terminal. These and other forms of event monitoring may alternatively be used in order to determine user behavior or characteristics regarding, for example, one or more of: (i) the user generally browsing the Internet, (ii) the user accessing a particular domain or website, (iii) the user viewing an online publication, (iv) the user accessing a social network resource, (v) the user consuming media online, (vi) the user participating in an online game, and/or (vii) the user operating a specific platform (e.g. web browser) or device (e.g. mobile device or tablet).

The event monitor 120 outputs activity log data 122 which is stored in the activity log 130. The information that is maintained in the activity log 130 for individual users can be based on privacy settings for individual users. For example, an opt-out mechanism may be used to enable individuals to opt-out of having information recorded about their online activity. Alternatively, the information that is recorded may be based on the user opting-in to have information recorded about their online activity, in order to provide a benefit to the user (e.g. more convenient time to receive emails or other communications). Furthermore, user information may be anonymized, so that the information recorded about the user activity is not associated with an identity of the user. The activity log data 122 may include information that identifies, for example, (i) a time of a particular activity of a user (e.g. time of day, day of week, etc.), (ii) a duration of the activity, (iii) a domain or network location for the activity, (iv) a content that was subject to the user interaction, (v) a type of the activity, and/or (vi) a device or platform used by the user to perform an activity. Additionally, the activity log data 122 may include data that identifies the user, either anonymously (e.g. numerically as shown in by examples of FIG. 3A or FIG. 3B) or otherwise. The activity log data 122 may be stored in the activity log data store 130 in association with the corresponding user.

The profile determination 140 processes the activity log data 122 to develop profile data 134 for individual users. For individual users, the user profile data 134 forms part of the user profile 105, which includes timing information 106 (including desired transmission times 116) and topical/category preferences 118. The profile determination 140 may implement processes that include identifying, from historical or past instances of user activity, predictions as to when the user is most likely to be participating (or available to participate) in a given online activity or otherwise receptive to receiving a communication from a communication service.

In one implementation, the profile determination 140 determines periods of time (e.g. time slots) where user is likely to be online or otherwise participating in online activity. Such periods of time may correspond to the user being logged into a website or user profile, performing general Internet browsing activities, online gaming, reading an online publications and newsletters, shopping or other performing other activities such as described elsewhere in this application. The periods of time may correspond to hours of the particular day, hours of the particular type of day (weekdays or weekends), days of the week, days of the month, etc. The granularity of the periods of time may correspond to several hours (e.g. 10 AM to 4 PM) or to a specific hour, or even more specific granularity (e.g. at 9 AM precisely, or within 5 minutes of 9 am).

In other implementations, the output from the profile determination 140 may be used as a real-time trigger to cause the messaging services 150, 160 to send a communication to the user on the assumption that the user is currently online. For example, the messaging services 150, 160 may trigger to send an email regarding promotions based on the profile information 142 indicating the user as being presently online. In other variations, the profile information 142 may trigger the messaging services 150, 160 to identify programming (e.g., dramatic shows or sitcoms, interactive programs etc.) that is available, or otherwise being broadcast, in real-time when the user is deemed to be online or partaking in a particular online activity. For example, a user may be logged into a content website, and then receive an email from the content site or its affiliate regarding a particular program or programming event that is available at the time the user is deemed to be online.

Additionally, profile determination 140 may determine other user profile data 134 based on the activity information 132, including category or topical preferences of the user, particularly as it may pertain to certain activities. For example, the profile determination 140 may determine a user's topical or category preference for online activity corresponding to types of (i) newsletters that the user selects or prefers (e.g. a user may favor travel newsletters, or a user may disfavor technical newsletters), (ii) content included in promotional or commercial emails or messages that the user prefers (e.g. preferred types of products, preferred merchants), and/or (iii) content included in advertisements provided with messages communicated to the user.

In this way, profile determination 140 determines at least some of the informational components of the user profile 105 for individual users that comprise a group (e.g. subscriber base for a messaging service 150, 160). Other components of the user profile 105 may be provided from other sources, such as user input, or information resources associated with the user.

The profile service 148 operates to communicate or implement profile data for individual users of messaging services 150, 160 (or other communication services). Specifically, an embodiment provides that the profile service 148 accesses user profile data 134 for individual users based on a user identifier 136. The user identifier 136 may be specified by, for example, messaging services 150, 160, which can operate on lists subscribers or receivers for messaging content. In one embodiment, profile service 148 communicates with one or more messaging services 150, 160. The profile service 148 may communicate to provide user profile information 142 to one or more messaging services 150, 160. The user profile information 142 for a given user may serve to accommodate a specific aspect of the user profile, as provided to the profile service 148. In particular, the profile service 148 may communicate profile information 142 that predicts a suitable or optimal time, or window of time, for which the user should receive messaging content. The predicted time may be based on the corresponding user profile data 134. Additionally, the predicted time(s) may be specific to (i) a category of content or message type (e.g. best time to send sporting news content, best times to send promotional emails), (ii) a messaging service (e.g. suitable times for sending commercial SMS messages versus email messages), or (iii) general in scope (e.g. applicable to all messaging services are messaging content).

In addition to the suitable or optimal predicted time or window, the profile service 148 may communicate other information, including selection of topical or categories for messaging content that the corresponding users is to receive from the messaging service 150, 160. For example, the profile service 148 may select 144 which messaging services 150, 160 are to communicate with the user. The messaging services 150, 160 may be distinguished by, for example, domain, operator, purpose, transport mode (e.g. SMS versus email) and/or topic/category. Still further, the profile service 148 may select the topical category of the messaging content to the user is to receive from a given one of the messaging services 150, 160.

As mentioned, the messaging services 150, 160 may operate independently, or as part of system 100. Each messaging service 150, 160 can optionally include components to handle or otherwise process profile information 142 received from the profile service 148. In one embodiment, messaging service 150, 160 includes a queue handler 152, which queues the messaging content for individual users based on the transmission time 116 that is specified in that user's profile information. For example, one of the messaging services 150, 160 may correspond to a service that transmits the messaging content in the form of numerous messages to a subscriber base of users. Each user may receive the same messaging content, and different messages (e.g. the messages may differ in that they have different addressees) may be transmitted carrying the same messaging content to individuals in the subscriber base, but the messages may be transmitted at different times. The user profile information 142 provided from the profile service 148 serves to specify the time in which the individual transmissions are sent out for each user, in order to optimize the user's reception of the messaging content. For example, the messaging content may include inherent monetization aspects (e.g. receivers of the email click links carried in the emails if the users are interested) which are enhanced if the users receive the respective messages at a time that is likely to cause a favorable response from the user (e.g. user clicking link, or opening email). One result that can be achieved is that individual users in the subscriber base of messaging service 150, 160 receive messages at different times, based on a determination as to when that user is most likely to favorably respond to the communication (e.g. user clicks on a link embedded in an email or provides some other form of favorable response).

As an alternative or additional variation to some embodiments described, system 100 may be modified or incorporated to communicate with users for purpose of suggesting time-based content programming to the user. For example, profile information 142 may be utilized by the messaging service(s) 150, 160 as a mechanism for suggesting television or Internet programming to the user based on the user's past or current behavior. For example, if the profile information 142 identifies the user as a heavy website user in the evenings, the messaging service(s) 150, 160 may utilize this information to send communications to the user (e.g., email, text message) that suggests programming (e.g., television shows, Internet programming etc.) that is complimentary to the user's behavior. For example, the communication from the messaging service 150, 160 may include a suggestion for the user to view a programming broadcast (e.g. sitcom, sporting event, interactive program) on the Internet at the time the user is known (e.g., by way of the profile information 142 reflecting real-time user behavior) or predicted to be online. Additionally, such program may also be selected based on, for example, the subject matter relating to the user's interests or being available from a particular website that the user is known or predicted to access.

As described with other embodiments, the communication may be timed to be sent at a time that is based on when the user is known or predicted to be online or partaking in a particular online activity. Alternatively, the communication may be communicated at a designated time that is not specific to user behavior, but which selects or identifies programming for the user based on the known or predicted time of the user behavior.

Methodology

Figure 2:
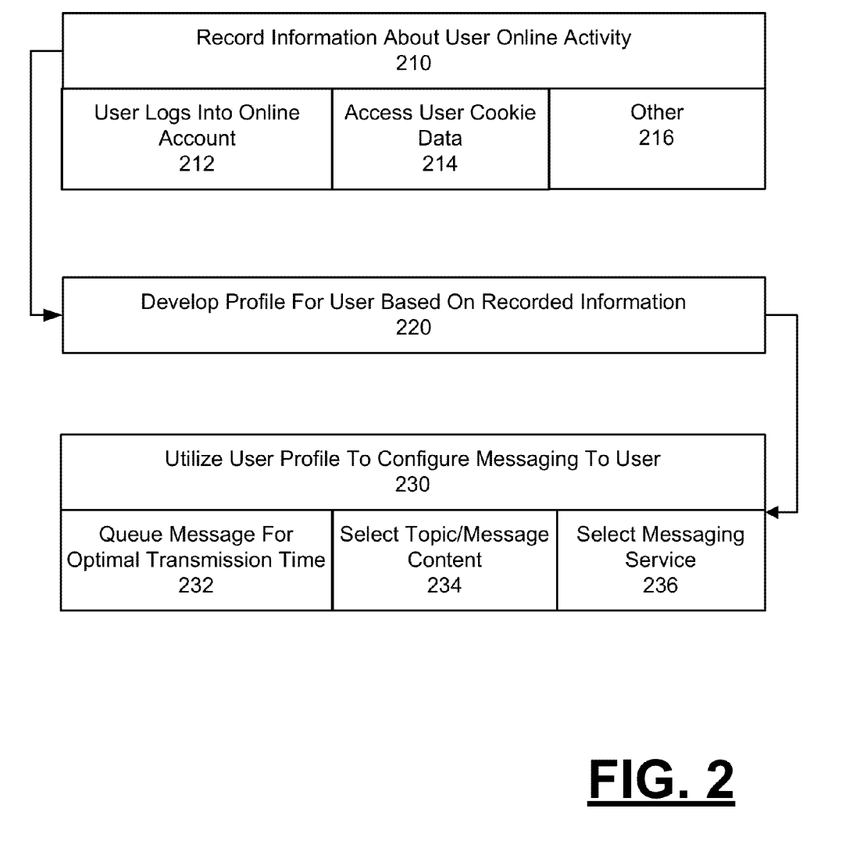
FIG. 2 illustrates a method for operating a messaging service, according to one or more embodiments.

FIG. 2 illustrates a method for operating a messaging service, according to one or more embodiments. A method such as described by an embodiment of FIG. 2 may be implemented using components such as described with system 100 of FIG. 1. Accordingly, reference may be made to components or elements of FIG. 1 for purpose of illustrating suitable components or elements for performing a step or sub-step being described.

According to one more embodiments, information about user online activity is recorded (210). Various types of information can be recorded, depending on implementation specifics and design. In one embodiment, the user's login and/or logout time is recorded for a particular Web service or Internet domain activity (212). For example, a user may register for premium content at a website, requiring the user to provide login and password information when accessing the website. When the user logs in to the website, the activity is recorded, including the time that the user login and/or logout. In this regard, the event monitor 120 may receive user activity input 112 corresponding to a user's session login, session logout, and/or domain specific activity while the user was logged in. The system 100 may receive such information from a web service or website, or alternatively be part of an architecture on which the website or web services host.

As an alternative or addition, information about the user's online activity can be determined from data items stored on user terminals (214), such as cookies (e.g. session cookies, tracking cookies, Flash cookies, etc.). Such data items can provide, for example, information such as websites that the user accessed in a given time period, such as a day of the week. Thus, with reference to FIG. 1, the event monitor 120 may retrieve user activity data 112 from sources such as cookies stored on user terminals.

Other sources may also be used to identify user activity input 112 (216). For example, a user's browser may include programming (e.g. Plug-in, script, etc.) that reports session activity to the event monitor 120.

Various types of information can be recorded from the user online activity. In one embodiment, the information that is recorded identifies, for example, instances of time when: (i) the user is online (e.g. logged into the website, open the browser is performing general network browsing, etc.), (ii) a user is at a particular domain or using a particular web service, (iii) a user performs a particular type of activity, such as general browsing or e-commerce activities, (iv) the user operates a device (e.g. tablet or mobile device using cellular connection) or platform (e.g. specific browser), and/or (v) a user performs the desired specific activity, such as responding favorably to a message from the messaging service 150, 160 (e.g. the user clicks on a embedded link in a commercial e-mail). Accordingly, in addition to the timing information 106, one or more embodiments provide that the information recorded about the user online activity includes identification of the activity that the user performed by characteristic or type.

The information recorded about individual user online activity can be used to develop a corresponding profile for each user (220). A user profile may identify timing information that corresponds to a predicted preference of the user to receive communications or messages, programmatically determined topical or category preferences of the user regarding content that is to be communicated to the user, and/or the type of activity that the user may perform at a given time period.

In one embodiment, profile determination 140 develops the user profile 105 to include specific timing information 106 as to when the user is likely receptive to messaging content, such as when the user is online, or performing a specific online activity (reading e-mails, log into an web service, etc.). Furthermore, the profile determination 140 may identify specific transmission times 116 for when the corresponding user is most receptive to an incoming message or communication from one or more of the messaging services 150, 160. As noted, such predicted transmission times 116 may be based on determinations such as when the user is expected to be online, or when the user is online and performing a specific type of activity (e.g. browsing, reading emails, logged into a particular website, gaming, online shopping, etc.). In variations, the transmission times may be used as real-time triggers to signal when the user is actively online or partaking in a particular activity.

The user profile 105 may be used to configure operations of the messaging service 150, 160 in transmitting messaging content to individual users in a group (230). For example, a group of users may correspond to a subscriber base of an email subscription, and timing information 106, included as part of the user profiles 105 for individual users of the group, can be used to select transmission times for when messaging content is to be transmitted to individual users.

Accordingly, the timing information 106 may be used to queue messages that are to be transmitted from a messaging service based on a predicted or determined optimal transmission time for individual users (232) that is deemed suitable (e.g. above a threshold) or optimal (e.g. heaviest period of activity). The profile determination 140 may determine, for example, the transmission time(s) to be one that corresponds to, for example, a time when (i) the user is likely performing online activities, such as web browsing; (ii) the user is likely performing a particular type of online activity, such as being logged in with a website or web-service; and (iii) the user is more likely to respond favorably to receiving a message of a particular type (e.g. promotional email) from one of the messaging services 150, 160. In some variations, the messages may be queued or otherwise generated as a real-time response to information that indicates the user is online (or partaking in a particular online activity) at the particular moment.

Additionally, some embodiment may use the profile information to select a topic or category for messaging content that is to be communicated to a user (234). For example, the profile determination 140 may use information that identifies the type of activity the user performs at the predicted optimal time (e.g. e-commerce activity, session login at a website, etc.) in order to select a category type for messaging content that is to be communicated to the user. Both the type of activity and the time that the user is engaged in the activity may be used in configuring or otherwise operating the messaging service 150, 160 in sending a type-specific message to the user at a predicted optimal time. For example, the profile determination 140 may determine that the user is most likely to engage in e-commerce activity at a particular time of day. The profile service 148 may specify that promotional emails regarding, for example, products on sale, are to be sent to a particular user at the time when that user is likely online, or alternatively, at a time (or just prior to) when the particular user is likely to be engaged in a relevant e-commerce activity (such as online shopping).

Still further, an embodiment may provide for the profile determination 140 to determine a topical interest of the user from information associated with the user, including activity log data 132. For example, if the user's interest is to browse sports sites at a particular time, the profile determination 140 may specify that the user is to receive sporting related messages.

In addition to selecting topic or messaging category for a user, variations may select messaging services that are to communicate to the user (236). For example, profile determination 140 may recommend one messaging service (e.g. newsletter on technical products) over another (e.g. newsletter on women's clothing) based on the profile information of the user, which can specify the determined user's topical or category preferences for such communications. Similar considerations may be made for communications services that operate under different communication transports or protocols (e.g. email versus SMS or Instant Message).

EXAMPLES

Figure 3A:
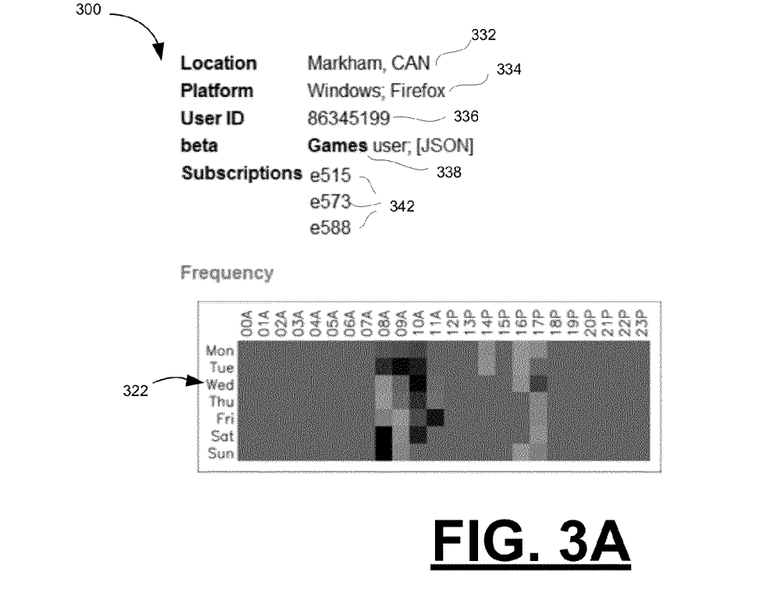
FIG. 3A and FIG. 3B provide graphic examples of user profile records, according to one or more embodiments.
Figure 3B:
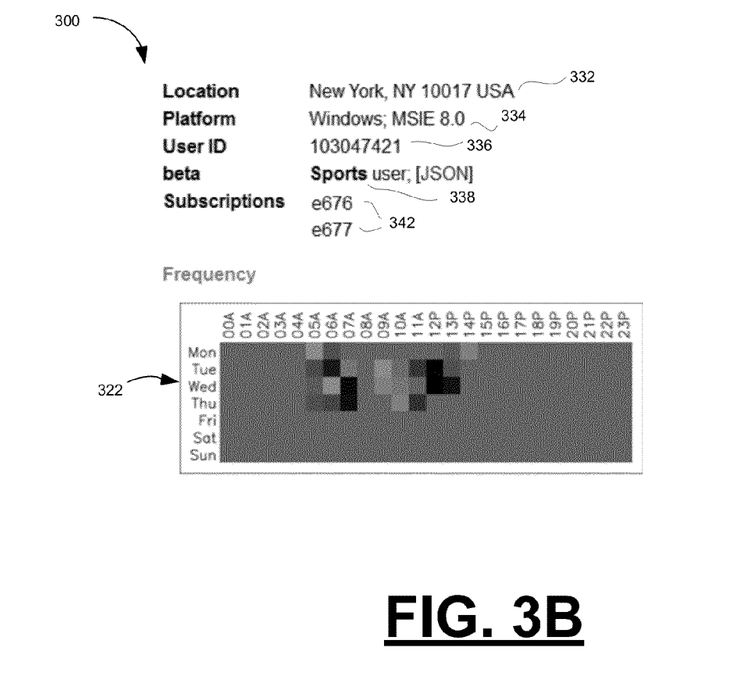

FIG. 3A and FIG. 3B provide graphic examples of user profile records, according to one or more embodiments. Each user profile record 300 includes profile data (e.g. transmission profiles) for a corresponding user of a messaging service. Embodiments such as described may record and/or utilize such profile data in accordance with privacy settings of the user or policies followed by the online forums(s). Regarding descriptions in which personal information is used, users can be provided with an opportunity to opt in/out of services or features which collect personal or private information (e.g. user name, preference, history or past transactions, user locality, etc.). Additionally, embodiments can be implemented in a manner that anonymizes the individual users to system 100, so that any information that is collected about the user is not associated with the user's identity. Rather, a user of system 100 can be associated with, for example, a unique identifier, from which the user's true identity is not determinable.

In one implementation, user profile records 300 include location parameters 332, a platform parameter 334, a user identifier 336, and a topical categorization parameter 338. The location parameter 332 can be determined from, for example, user input, the user's primary ISP (Internet Service Provider) address, credit card information or other sources. The platform parameter 334 reflects information communicated from, for example, a cookie or browser of a user terminal during an online session. The topical categorization parameter 338 reflects the subject matter interest of the user, such as subject matter that is particularly relevant to messaging content that is of interest to the user. For example, the user's interest in a particular website or subscription service can be used to identify the general topical category for the user's interest (e.g. sports).

Additionally, user identifier records 300 may maintain identifiers 342 for a messaging service or subscription of the user. The identifiers 342 may further reference a user identifier (e.g. email address and/or anonymous numeric identifier), so that the profile data maintained with the record 300 can identify the user to, for example, a messaging service.

In an example shown, a calendar grid 322 displays a level of user online activity by time slot for days of the week. In the example provided, the level of user activity is represented by a color code, with separate colors representing moderate level of activity (e.g. green), heavy level of activity (red, black) or no activity. According to embodiments, the user's level of activity is used to determine time slots for when the corresponding user should receive a communication, such as an email message from, for example, an email service, SMS service, Instant Message, or online chat service. In embodiments, the time slots for transmission times (when the user should receive a communication) may, for example, be selected to correspond to one or more time slots (i) when the user activity is greatest; (ii) when the user activity is above a threshold level, (iii) that encompass or are proximate to time slots of greatest user activity (or above a threshold), and/or (iv) that exclude time slots when there is no or little user activity (e.g. less than threshold).

In variations, the transmission time(s) selected for users may be selected by determining a combination of factors that include the time slots of determined user activity. For example, the transmission times may be based in part on user-specific factors, such as user-interests (e.g. topical categorization parameters) or non-user specific parameters such as a day of the week that is preferred for transmission.

In the examples provided, the time slots are defined hourly, based on the days of the week. In alternative implementations, the time slots may be based on other ranges of time, such as by quarter hour, minutes, blocks of hours, etc. Still further, the time slots may be based on longer time scales, such as a month (or portion thereof) or portion of a year, so that the user online activity is related to a time of month or a time of year.

As an alternative or addition to using the level of user activity at specific time intervals, one or more embodiments may include recording timing information for when the user performs a specific type of online activity, such as log in to a specific website, perform e-commerce activity (e.g. make a purchase), or select links embedded in an email.

As discussed elsewhere, various types of communications may be received by the user from different forms of communication services. In one embodiment, the communication service sends messages through, for example, SMS to a mobile device of an end user. The transmission of the SMS message may be communicated at a time when, for example, (i) the user is likely to be utilizing the mobile device for web browsing, (ii) the mobile device is online on a cellular network, and/or (iii) the mobile device is being used in a particular manner, such as browsing. The SMS messages that can be communicated to the user include commercial or promotional messages, as well as those that embed links or other triggers for enabling the user to access additional content or resources.

Hardware System Description

Figure 4:
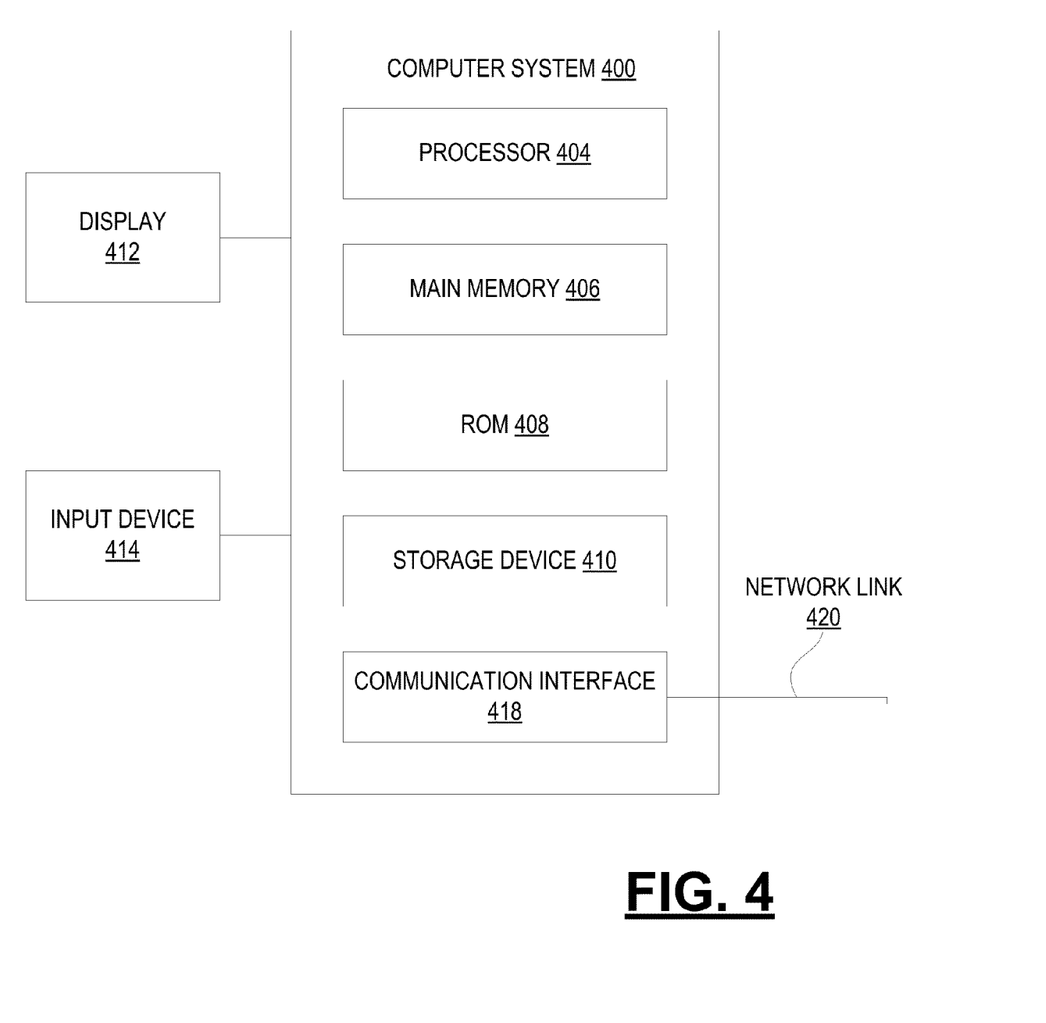
FIG. 4 illustrates a computing system on which one or more embodiments may be implemented.

FIG. 4 is a block diagram that illustrates a computer system upon which embodiments described herein may be implemented. For example, in the context of FIG. 1, system 100 may be implemented using a computer system such as described by FIG. 4.

In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 may also include a read only memory (ROM) 408 or other static storage device for storing static information and instructions for processor 404. A storage device 410, such as a magnetic disk or optical disk, is provided for storing information and instructions. The communication interface 418 may enable the computer system 400 to communicate with one or more networks through use of the network link 420 (e.g. wirelessly).

Computer system 400 can include display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments may include any number of input devices 414 coupled to computer system 400.

Embodiments described herein are related to the use of computer system 400 for implementing the techniques described herein. According to one embodiment, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments described herein. Thus, embodiments described are not limited to any specific combination of hardware circuitry and software.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A computer-implemented method for operating a messaging service, the method implemented by one or more processors and comprising:
   using the one or more processors to perform steps comprising:
   monitoring online activities of a plurality of users;
   based on the online activities, determining, for each respective one of the plurality of users, (i) a transmission time in which browsing operations of the respective user exceed a predetermined threshold, and (ii) content preferences indicating a type of content to which the respective user is most likely to respond;
   creating a user profile, for each of the plurality of users, indicating the transmission time and the content preferences for the respective user;
   determining a present context of current online activity by the respective user;
   selecting messaging content for the respective user based on the determined content preferences in the user profile and the present context of the current online activity;
   queuing the messaging content for transmission to the respective user based on the determined transmission time in the user profile; and
   transmitting the messaging content to the respective user in accordance with the determined transmission time in the user profile.

2. The method of claim 1, wherein determining the transmission time includes determining one or more time slots for a given day in which the respective user is most likely to be online.

3. The method of claim 1, further comprising:
   associating the user profile with an identifier unique to the respective user;
   wherein selecting the messaging content for the respective user includes using the unique identifier to access the user profile and identify the determined content preferences.

4. The method of claim 3, further comprising:
   based on the present context of the current online activity, selecting additional messaging content for the respective user;
   identifying a user login to the messaging service by the respective user; and
   in response to identifying the user login, transmitting the additional messaging content to the respective user over the messaging service.

5. The method of claim 4, wherein the present context of the current online activity corresponds to the respective user browsing multiple websites of a particular type, the particular type corresponding to one of e-commerce sites, online publication sites, sports sites, or online gaming sites.

6. The method of claim 1, wherein the messaging content is transmitted via one or more of a third party e-mail service, a Short Message Service, or a Multimedia Message Service.

7. A system for operating a messaging service, the system comprising:
   one or more processors; and
   one or more memory resources storing instructions that, when executed by the one or more processors, cause the one or more processors to:
   monitor online activities of a plurality of users;
   based on the online activities, determine, for each respective one of the plurality of users, (i) a transmission time in which browsing operations of the respective user exceed a predetermined threshold, and (ii) content preferences indicating a type of content to which the respective user is most likely to respond;
   create a user profile, for each of the plurality of users, indicating the transmission time and the content preferences for the respective user;
   determine a present context of current online activity by the respective user;
   select messaging content for the respective user based on the determined content preferences in the user profile and the present context of the current online activity;
   queue the messaging content for the respective user based on the determined transmission time in the user profile; and
   transmit the messaging content to the respective user in accordance with the determined transmission time in the user profile.

8. The system of claim 7, wherein determining the transmission time includes determining one or more time slots for a given day in which the respective user is most likely to be online.

9. The system of claim 7, wherein the instructions, when executed by the one or more processors, further cause the one or more processors to:
   associate the user profile with an identifier unique to the respective user;
   wherein selecting the messaging content for the respective user includes using the unique identifier to access the user profile and identify the determined content preferences.

10. The system of claim 9, wherein the instructions, when executed by the one or more processors, further cause the one or more processors to:
- based on the present context of the current online activity, select additional messaging content for the respective user;
- identify a user login to the messaging service by the respective user; and
- in response to identifying the user login, transmit the additional messaging content to the respective user over the messaging service.

11. The system of claim 10, wherein the present context of the current online activity corresponds to the respective user browsing multiple websites of a particular type, the particular type corresponding to one of e-commerce sites, online publication sites, sports sites, or online gaming sites.

12. The system of claim 7, wherein the messaging content is transmitted via one or more of a third party e-mail service, a Short Message Service, or a Multimedia Message Service.

13. A non-transitory computer readable medium storing instructions that, when executed by one or more processors of a messaging service, cause the one or more processors to:
- monitor online activities of a plurality of users;
- based on the online activities, determine, for each respective one of the plurality of users, (i) a transmission time in which browsing operations of the respective user exceed a predetermined threshold, and (ii) content preferences indicating a type of content to which the respective user is most likely to respond;
- create a user profile, for each of the plurality of users, indicating the transmission time and the content preferences for the respective user;
- determine a present context of current online activity by the respective user;
- select messaging content for the respective user based on the determined content preferences in the user profile and the present context of the current online activity;
- queue the messaging content for transmission to the respective user based on the determined transmission time in the user profile; and
- transmit the messaging content to the respective user in accordance with the determined transmission time in the user profile.

14. The non-transitory computer readable medium of claim 13, wherein determining the transmission time includes determining one or more time slots for a given day in which the respective user is most likely to be online.

15. The non-transitory computer readable medium of claim 13, wherein the instructions, when executed by the one or more processors, further cause the one or more processors to:
- associate the user profile with an identifier unique to the respective user;
- wherein selecting the messaging content for the respective user includes using the unique identifier to access the user profile and identify the determined content preferences.

16. The non-transitory computer readable medium of claim 15, wherein the instructions, when executed by the one or more processors, further cause the one or more processors to:
- based on the present context of the current online activity, select additional messaging content for the respective user;
- identify a user login to the messaging service by the respective user; and
- in response to identifying the user login, transmit the additional messaging content to the respective user over the messaging service.

17. The non-transitory computer readable medium of claim 16, wherein the present context of the current online activity corresponds to the respective user browsing multiple websites of a particular type, the particular type corresponding to one of e-commerce sites, online publication sites, sports sites, or online gaming sites.

18. The non-transitory computer readable medium of claim 16, wherein the messaging content is transmitted via one or more of a third party e-mail service, a Short Message Service, or a Multimedia Message Service.

* * * * *